(12) United States Patent
Xie

(10) Patent No.: US 12,328,293 B1
(45) Date of Patent: Jun. 10, 2025

(54) COMMUNICATION NODE AND METHOD FOR ROUTING DATA PACKETS FOR A CLIENT DEVICE

(71) Applicant: TP-Link Systems Inc., Irvine, CA (US)

(72) Inventor: Ping Xie, Shenzhen (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 18/802,806

(22) Filed: Aug. 13, 2024

(51) Int. Cl.
*G06F 15/16* (2006.01)
*H04L 61/256* (2022.01)

(52) U.S. Cl.
CPC .................................. *H04L 61/256* (2013.01)

(58) Field of Classification Search
CPC ............... H04L 61/256; H04L 61/2596; H04L 61/2521; H04L 61/2532
See application file for complete search history.

(56) References Cited

U.S. PATENT DOCUMENTS

| | | | | |
|---|---|---|---|---|
| 7,107,360 | B1 * | 9/2006 | Phadnis | H04L 61/255 709/239 |
| 7,948,986 | B1 * | 5/2011 | Ghosh | H04L 45/50 370/392 |
| 2011/0103387 | A1 * | 5/2011 | Jayasenan | H04L 61/00 370/392 |
| 2013/0151661 | A1 | 6/2013 | Koponen | |
| 2019/0280979 | A1 * | 9/2019 | Jain | H04L 47/12 |
| 2023/0116510 | A1 * | 4/2023 | Shroff | H04L 61/2514 370/329 |
| 2024/0154929 | A1 * | 5/2024 | Kraiser | H04L 61/2517 |

FOREIGN PATENT DOCUMENTS

| | | |
|---|---|---|
| CN | 101697528 A | 4/2010 |
| CN | 109863735 A | 6/2019 |
| CN | 116939586 A | 10/2023 |

OTHER PUBLICATIONS

Jisuanji Wangluo Jichu, Fundamentals of computer network, pp. 190-193.
Shuju Tongxin Yu Wangluo Jishu, Data communication and network technology, Harbin Engineering University Press, pp. 170-176.

* cited by examiner

*Primary Examiner* — Duyen M Doan
(74) *Attorney, Agent, or Firm* — Loeb & Loeb LLP

(57) ABSTRACT

The present disclosure provides a communication node and method for routing data packets for a client device. The communication node includes: one or more processors; a memory coupled to the processors; and computer program instructions stored in the memory, which, when executed by the processors, perform actions of: obtaining, from a downstream communication node, NAT routing information for a data packet communicated between the client device and an external node through at least the communication node and the downstream communication node; and performing NAT on a subsequent data packet to be communicated between the client device and the external node based on the NAT routing information.

20 Claims, 5 Drawing Sheets

COMMUNICATION NODE AND METHOD FOR ROUTING DATA PACKETS FOR A CLIENT DEVICE

TECHNICAL FIELD

The present disclosure relates to wireless communication, and specifically, to a communication node and method for routing data packets for a client device.

BACKGROUND

With an increasing number of client devices connected to the Internet, the scarcity of available IP addresses has become a significant challenge. Network Address Translation (NAT) technology plays a crucial role in solving this issue by allowing multiple client devices to share a single public IP address. For example, NAT enables translations between private (internal) IP addresses and public IP addresses, facilitating communication of data packets between client devices within a private network and an external site via the Internet.

In modern communication networks, the exchange of data packets between a client device and an external site often involves the traversal of multiple communication nodes along a data routing path. Each communication node may perform specific functions, such as routing, addressing, and security checks, before routing the data packet to the next hop along the routing path. The process of NAT, which is essential for allowing client devices with private IP addresses to communicate over the Internet using shared public IP addresses, must be efficiently managed across these communication nodes.

There is a need for an improved mechanism for routing data packets for a client device across communication nodes while supporting NAT technology.

SUMMARY

In view of the above problems, the present disclosure provides a communication node and method for routing data packets for a client device.

According to one embodiment of the present disclosure, there is provided a communication node for routing data packets for a client device, the communication node comprising: one or more processors; a memory coupled to at least one of the processors; and a set of computer program instructions stored in the memory. The set of computer program instructions, when executed by at least one of the processors, perform actions of: obtaining, from a downstream communication node, Network Address Translation (NAT) routing information for a data packet communicated between the client device and an external node through at least the communication node and the downstream communication node; and performing NAT on a subsequent data packet to be communicated between the client device and the external node based on the NAT routing information.

According to another embodiment of the present disclosure, there is provided a method for routing data packets for a client device, the method implemented in a communication node and comprising: obtaining, from a downstream communication node, Network Address Translation (NAT) routing information for a data packet communicated between the client device and an external node through at least the communication node and the downstream communication node; and performing NAT on a subsequent data packet to be communicated between the client device and the external node based on the NAT routing information.

According to yet another embodiment of the present disclosure, there is provided a computer program product for routing data packets for a client device, the computer program product comprising a non-transitory computer readable storage medium having program instructions embodied therewith, the program instructions executable by a processor of a communication node to cause the processor to: obtain, from a downstream communication node, Network Address Translation (NAT) routing information for a data packet communicated between the client device and an external node through at least the communication node and the downstream communication node; and perform NAT on a subsequent data packet to be communicated between the client device and the external node based on the NAT routing information.

According to still another embodiment of the present disclosure, there is provided a data routing system comprising at least an upstream communication node and a downstream communication node. Each of the upstream communication node and the downstream communication node comprising: one or more processors; a memory coupled to at least one of the processors; and a set of computer program instructions stored in the memory, which, when executed by at least one of the processors, perform a series of actions. The downstream communication node is configured to generate Network Address Translation (NAT) routing information for a data packet communicated between the client device and an external node through at least the upstream communication node and the downstream communication node; and provide the NAT routing information to the upstream communication node. The upstream communication node is configured to obtain the NAT routing information from the downstream communication node; and perform NAT on a subsequent data packet to be communicated between the client device and the external node based on the NAT routing information on behalf of the downstream communication node.

At least based on the above embodiments of the present disclosure, an improved mechanism for routing data packets for a client device through multiple communication nodes of a data routing network can be realized while effectively utilizing the capabilities of the communication nodes, addressing the latency caused by downstream communication nodes with weak performance, and accelerating the transfer of data traffic accordingly.

According to the embodiments of the present disclosure, the improvement in data throughput is realized by transferring the NAT related task from the downstream communication node with weaker performance to the upstream communication node with stronger performance. In conventional data routing networks, the bottleneck of the overall system performance lies in the limited capabilities of the downstream communication node. However, in the present disclosure, the NAT related task, which has high performance requirements, is transferred to the upstream communication node, such that the data packets will not be stuck at the downstream communication node waiting to be NAT processed, and such that the overall data throughput of the system can be enhanced.

BRIEF DESCRIPTION OF THE DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure, but do not constitute a limitation on the present disclosure. In the drawings, unless otherwise explicitly indicated, the same reference numerals refer to the same components, steps or elements.

DETAILED DESCRIPTION

Figure 1:
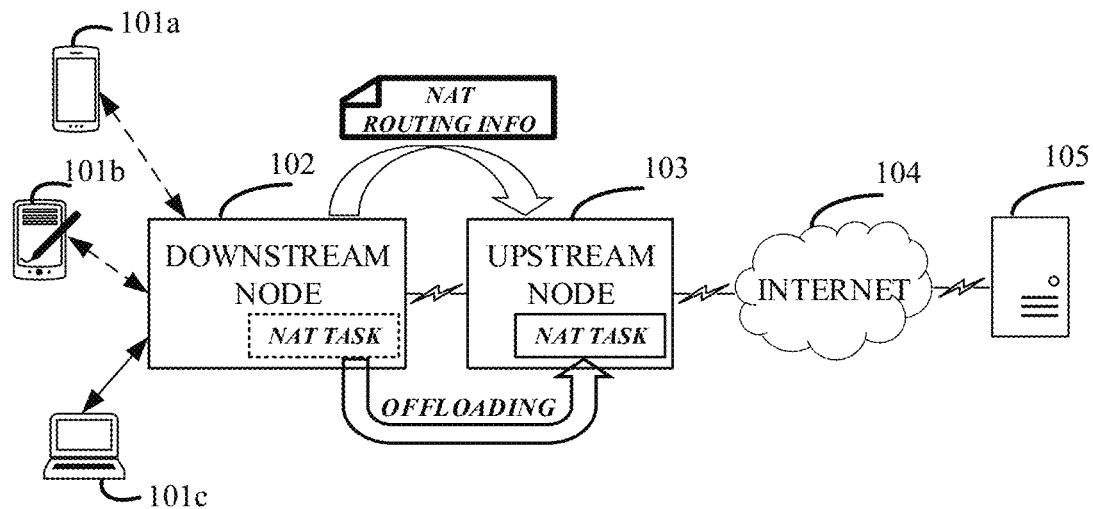
FIG. 1 shows an exemplary architecture for routing data packets for a client device according to an embodiment of the present disclosure.

The technical solution of the present disclosure will be clearly and completely described below in conjunction with accompanying drawings. Obviously, the described embodiments are part of embodiments of the present disclosure, but not all of them. Based on the embodiments in the present disclosure, all other embodiments obtained by ordinary skilled in the art without making any creative efforts fall within the scope of protection of the present disclosure.

In the description of the present disclosure, it should be noted that orientations or positional relationships indicated by terms such as "center", "upper", "lower", "left", "right", "vertical", "horizontal", "inside" and "outside" are based on orientations or positional relationships shown in the drawings, only for the convenience of describing the present disclosure and simplifying the description, instead of indicating or implying the indicated device or element must have a particular orientation. In addition, terms such as "first", "second" and "third" are only for descriptive purposes, and cannot be understood as indicating or implying relative importance. Likewise, words like "a", "an" or "the" do not represent a quantity limit, but represent an existence of at least one. Words like "include" or "comprise" mean that an element or an object in front of the said word encompasses those ones listed following the said word and their equivalents, without excluding other elements or objects. Words like "connect" or "link" are not limited to physical or mechanical connections, but may include electrical connections, whether direct or indirect.

In the description of the present disclosure, it should be noted that, unless otherwise explicitly specified and limited, terms such as "mount", "link" and "connect" should be understood in a broad sense. For example, such terms may refer to being fixedly connected, or detachably connected, or integrally connected; may refer to being mechanically connected, or electrically connected; may refer to being directly connected, or indirectly connected via an intermediate medium, or internally connected inside two elements. For ordinary skilled in the art, the meanings of the above terms in the present disclosure may be understood on a case-by-case basis.

In addition, technical features involved in different embodiments of the present disclosure described below may be combined with each other as long as no conflicts occurs therebetween.

In the present disclosure, an AP, which may be interchangeably referred to as a wireless access point (WAP), is a communication device that can communicate with a non-AP (e.g., a station (STA) or client device) in a WLAN and that allows the non-AP to connect to a wired network. The AP usually connects to a router (via a wired network) as a standalone device, but it can also be integrated with or employed in the router. Likewise, in the present disclosure, a non-AP (e.g., a client device or station, which is interchangeably referred to as a STA) is a communication device that can communicate with an AP to obtain various communication services such as voice, video, packet data, messaging, broadcast, etc. The STA can be any device that contains an IEEE 820.11-conformant media access control (MAC) and physical layer (PHY) interface to the wireless medium (WM). For example, a STA may be a laptop, a desktop personal computer (PC), a personal digital assistant (PDA), an access point or a Wi-Fi phone in a WLAN environment. The STA may be fixed or mobile. In the WLAN environment, the terms "STA", "client device", "wireless client", "user" and "user device" are often used interchangeably.

In the present disclosure, a STA in a WLAN may work as an AP at a different occasion, and vice versa. This is because communication devices in the context of IEEE 820.11 (Wi-Fi) technologies may include both STA hardware components and AP hardware components. In this manner, the communication devices may switch between a STA mode and an AP mode, based on actual WLAN conditions and/or requirements. In various embodiments below, a non-AP STA may refer to a STA in a WLAN that is not implemented as an AP.

FIG. 1 shows an exemplary architecture for routing data packets for a client device according to an embodiment of the present disclosure.

As shown in FIG. 1, the network topology 100 is depicted, illustrating three client devices 101a, 101b, and 101c (collectively referred to as client device 101), such as such as smartphones, tablets, computers, and other internet-capable devices, connected to a downstream communication node 102 (which is also referred to as a downstream node) via wired or wireless interfaces, such as Ethernet interface, and Wi-Fi interface (e.g., 2.4G, 5G and other available frequency bands). The downstream communication node 102 is, in turn, connected to an upstream communication node 103 (which is also referred to as an upstream node or simply a communication node). The upstream communication node 103 is further connected to an external node 105 via the Internet 104, which may be an external website or external server, among other examples. The network topology 100 facilitates the exchange of data packets between the client devices 101 with private IP addresses and the external node 105 through the upstream communication node 103 and the downstream communication node 102 and potentially additional communication nodes not shown in FIG. 1.

However, the network topology 100 as described above may face the following challenge. In the network topology 100, multiple communication nodes, such as the upstream communication node 103 and the downstream communication node 102, are needed for successfully delivering uplink packets from the client device 101 through the external node 105 or delivering downlink packets from the external node 105 to the client device 101. However, the downstream communication node 102 may have weaker performance compared to the upstream communication node 103. The downstream communication node 102, particularly when performing the NAT translations for the data packets, consumes a significant amount of CPU resources, thus acting as a bottleneck for the overall system performance.

For example, as for downlink traffic, when routing a downlink data packet (which is originated from the external node 105 and intended for the client device 101) along a segment of the data routing path between the upstream communication node 103 and the client device 101, the downstream communication node 102 needs to perform a NAT translation on the destination IP address of the downlink packet, before routing the packet to client device 101. Similarly, as for uplink traffic, when routing an uplink data packet (which is originated from the client device 101 and intended for the external node 105) along the segment of the data routing path between the client device 101 and the upstream communication node 103, the downstream communication node 102 needs to perform a NAT translation on the source IP address of the uplink packet, before routing the packet to the upstream communication node 103.

In conventional approaches for routing data packets along the data routing path comprising multiple communication nodes, the NAT related processing that needs to be performed by the downstream node with weaker performance may exceed the processing capacity of the downstream node, causing a bottleneck in the overall system.

In view of at least the above problem, the overall concept of the present disclosure is to leverage the superior performance of the upstream node to process the uplink/downlink data packet on behalf of the downstream node, such as NAT related tasks on the data packet. For example, the downstream node may first learn NAT related information (also referred to as "the NAT routing information" in the present disclosure) on its own, and then share the information to its upstream node, such that the upstream node may take over the NAT-related tasks on behalf of the downstream node. In an illustrative example, the NAT related information may be learnt by the downstream node for initial data packets routed between its connected client device and its upstream node, and the learnt NAT related information can be provided from the downstream node to the upstream node, such that the upstream node may use the NAT related information for processing subsequent packets to be communicated between the client device and the external node via the communication nodes.

It should be noted that the NAT related information can be generated in various ways, as long as the NAT related information contains useful clues that can assist the upstream node in taking over the execution of NAT tasks. In an example, the NAT related information may indicate the NAT related changes made to the initial data packets, e.g., NAT changes made to the source IP or destination IP of the initial data packets. By offloading the NAT related tasks to the upstream node, the downstream node can bypass the CPU-intensive NAT tasks when it forwards subsequent packets between its connected client device and its upstream node, and thus saves the overhead of CPU, thereby avoiding becoming a performance bottleneck and enhancing the overall network performance, such as the overall data throughput of the system.

As shown in FIG. 1, the downstream communication node 102 may be configured to generate the NAT routing information for an initial data packet communicated between the client device 101 and an external node 105 through at least the downstream communication node 102 and the upstream communication node 103. For example, the NAT routing information may be generated by the downstream communication node 102 based on one or more NAT related changes made to the initial data packet when routing the data packet between the client device 101 and the upstream communication node 103. In other words, initially, for data packets that require to be routed between the client device and the external node, the downstream node is responsible for learning the necessary processing it should perform on the packets when routing them between the client device and the upstream node. This includes the NAT-related changes (also referred to as NAT changes) made to the data packets during the NAT task. The downstream node may process and route the initial data packets between the client device and the upstream node on its own, simultaneously learning the NAT related changes made for these initial data packets.

Subsequently, the downstream communication node 102 may be configured to provide the NAT routing information to the upstream communication node 103, which is shown as "NAT ROUTING INFO" synchronized to the upstream communication node 103 in FIG. 1. Accordingly, the upstream communication node 103 may be configured to obtain the NAT routing information from the downstream communication node 102. In other words, the downstream node may synchronize and share the NAT related changes it has learned with the upstream node. This synchronization ensures that the upstream node is aware of the specific NAT related changes that the downstream node should made to the data packets (such as the NAT-related changes made to the packet's destination IP or source IP), so that the upstream node may later implement the NAT related changes on behalf of the downstream node.

Ultimately, based on the NAT routing information, the upstream communication node 103 may be configured to perform NAT on a subsequent data packet to be communicated between the client device 101 and the external node 105 on behalf of the downstream communication node 102. For example, the initial data packet and the subsequent data packet may correspond to a same UDP or TCP session, and thus share the same tuple consisting of source IP, source port, destination IP, destination port, and protocol. In this case, if the subsequent data packet corresponds to the same UDP or TCP session as the initial data packet, the subsequent data packet will match the information recoded in the NAT routing information (for example, certain data fields of the subsequent data packet match the information recoded in the NAT routing information), the overhead for conducting the NAT can be offloaded to the upstream node. In other words, when the upstream node encounters a data packet with attributes that match those recorded in the NAT routing information (for instance, a match in the tuple consisting of source IP, source port, destination IP, destination port, and protocol), it can perform the NAT processing on behalf of the downstream node. The downstream communication node 102, now relieved of the NAT processing burden, can simply forward the NAT-translated data packets to the next hop, which means that the downstream communication node 102 forwards the subsequent data packet transparently between the client device 101 and the upstream communication node 103 without performing additional NAT on the subsequent data packet.

This approach allows the downstream communication node 102 to bypass its NAT task and directly forward the data packets without additional NAT processing, as illustrated by the dashed line block representing the bypassed "NAT TASK" in FIG. 1. When subsequent data packets come to the upstream communication node 103, it refers to the stored NAT routing information and successfully takes over the NAT task on behalf of the downstream communication node 102, as illustrated by the arrow marked "OFF-LOADING" in FIG. 1. Based on the synchronization of NAT related information recorded by the downstream communication node 102, the upstream communication node 103 may take over the CPU-intensive NAT processing for subsequent data packets, ensuring that the downstream communication node 102 does not become a bottleneck. This approach not only conserves the CPU resources of the downstream node, but also reduces latency caused thereby. By leveraging the processing capabilities of the upstream node, the challenge of NAT processing bottlenecks in data routing networks can be addressed effectively.

In addition, there is no need for additional hardware acceleration engines or increased hardware costs. The present disclosure employs a software mechanism to transfer CPU-intensive tasks from low-performance nodes to high-performance nodes. This approach allows for an enhancement in the network's overall performance without incurring additional costs for hardware, making it a cost-effective solution for network optimization.

It should be noted that the number of client devices and communication nodes, as well as the specific connection topology illustrated in FIG. 1 are exemplary. There may be a varying number of client devices, additional communication nodes facilitating the routing of data packets between the client and the external node, and connection topologies that differ from those shown in FIG. 1. The present disclosure does not limit the specific configuration of the network topology or the interconnections.

Figure 4:
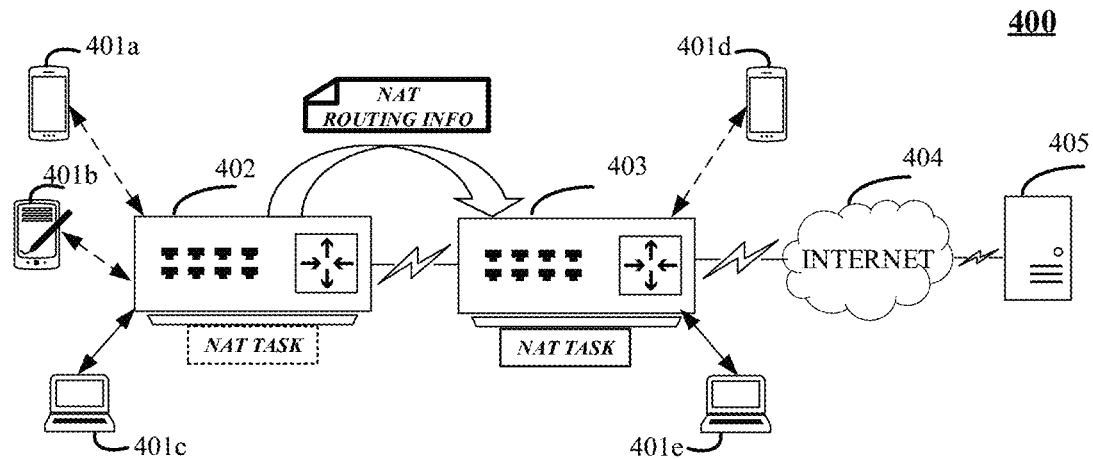
FIG. 4 shows an exemplary schematic diagram for routing data packets for a client device in a data routing network comprising an upstream router and a downstream router according to an embodiment of the present disclosure.
Figure 5:
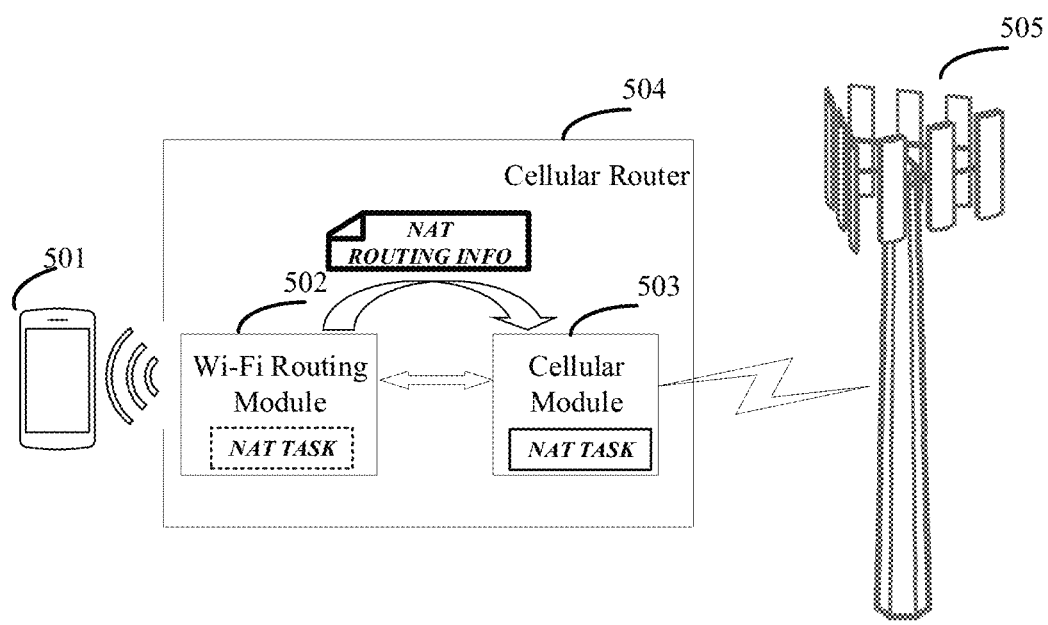
FIG. 5 shows an exemplary schematic diagram for routing data packets for a client device in a cellular router comprising a cellular module and a Wi-Fi routing module according to an embodiment of the present disclosure.

The term "node", as used in the context of the present disclosure, can refer to various granularities of network devices. As an example, a node can represent a device-level entity, such as a router. In scenarios where multiple routers are connected in a cascade, each router functions as an individual node within the network system, as shown in FIG. 4, which will be described hereinafter. As another example, the granularity of a node can also be at the chip or module level. In scenarios where a cellular router may have a dedicated 4G/5G chip for facilitating 4G/5G access capability and a Wi-Fi routing chip for facilitating local area network (LAN) expansion functionality, the nodes may correspond to the individual chips of the cellular router, as shown in FIG. 5, which will be described hereinafter.

In addition, the present disclosure is related to packet routing along multiple communication nodes, but does not impose restrictions on the physical medium through which the nodes are interconnected. The nodes can be connected via a variety of physical media, including but not limited to: Wi-Fi connections for wireless communication, Ethernet cables for wired LAN connections, USB interfaces for versatile and power-efficient data transfer, and PCIe (Peripheral Component Interconnect Express) interfaces for high-speed data communication, and the like.

Figure 2A:
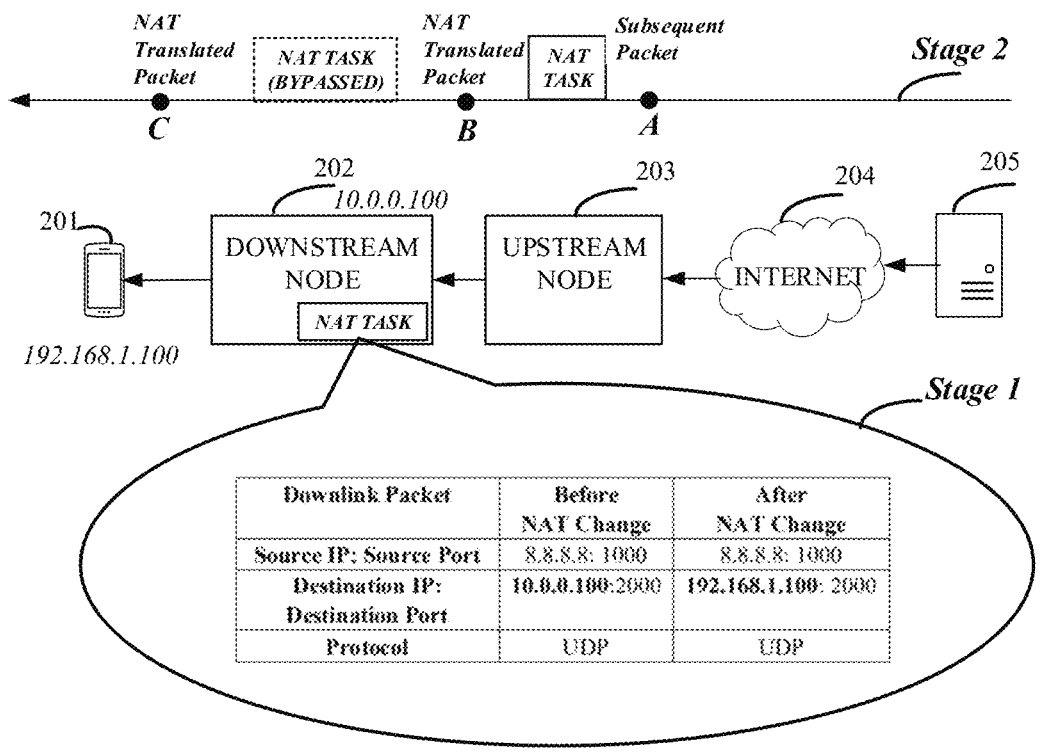
FIG. 2A shows an exemplary schematic diagram for routing downlink data packets for a client device according to an embodiment of the present disclosure.

FIG. 2A shows an exemplary schematic diagram for routing downlink data packets for a client device according to an embodiment of the present disclosure.

As shown in FIG. 2A, the network topology 200 described involves the transmission of a downlink data packet from an external node 205, through two communication nodes 203 and 202, and ultimately to the client device 201, via the Internet 204. It should be noted that the elements 201 through 205 are basically the same as the elements 101 through 105 in FIG. 1, with the detailed descriptions omitted for brevity. In FIG. 2A, the client device 201 has a private IP address of 192.168.1.100, and the downstream communication node 202 has an IP address of 10.0.0.100.

The processing of the downlink data packet will be described from the perspective of two stages: NAT entry learning and synchronization stage (as shown in Stage 1), and data packet acceleration processing stage (as shown in Stage 2).

Stage 1: NAT Entry Learning and Synchronization

As shown in Stage 1 of FIG. 2A, the downstream communication node 202 initially performs NAT processing on the downlink data packet on its own. Specifically, for an incoming packet at the downstream communication node 202 (which is originated from the external node 205 and routed to the downstream communication node 202 via the upstream communication node 203), the source IP and source port are 8.8.8.8:1000, and the destination IP and destination port are 10.0.0.100:2000, with the protocol being UDP. To ensure the packet successfully reaches the client device (which uses the private IP of 192.168.1.100), the destination IP needs to be modified to 192.168.1.100, as depicted by the content of "Destination IP" before and after the NAT change. After completing this NAT processing and learning the necessary NAT related changes for this packet, the downstream communication node 202 can then synchronize and share the NAT routing information related to this NAT change with the upstream communication node 203. This NAT routing information will be later used by the upstream communication node 203 for subsequent NAT processing of downlink packets, as described in Stage 2.

Stage 2: Data Packet Acceleration Processing

As shown in Stage 2 of FIG. 2A, at Point A, for subsequent downlink packets (for example, those subsequent downlink packets that have the same tuple consisting of source IP, source port, destination IP, destination port, and protocol as those downlink packet initially processed by the downstream node on its own in Stage 1), the upstream communication node 203 can use the NAT routing information synchronized from the downstream node 203 to perform the NAT processing that would otherwise been conducted by the downstream communication node 202. At Point B, the operation of the NAT task at the upstream communication node 203 results in the generation of a NAT translated packet, with the destination IP address being modified. Consequently, at Point C, upon receiving this NAT translated packet, the downstream communication node 202 can directly forward it to the client device 201 without the need for further NAT related changes, as indicated by the dashed line block representing the bypassed NAT task.

In the embodiments of the present disclosure, to allow for the synchronization of the NAT routing information for downlink traffic, the data packet initially processed by the downstream communication node 202 itself should be a downlink data packet, and the one or more NAT related changes indicated by the NAT routing information should include at least a change to a destination IP of the downlink data packet. Accordingly, in order to perform NAT on a subsequent downlink data packet to be communicated between the client device 201 and the external node 205 based on the obtained NAT routing information, the upstream communication node 203 performs the following actions.

Firstly, the upstream communication node 203 obtains a subsequent downlink data packet, which is originated from the external node 205 and routed to the upstream communication node 203. Subsequently, in response to a match between the subsequent downlink data packet and the NAT routing information, e.g., a match of certain field of the subsequent downlink data packet with the information contained in the NAT routing information, the upstream communication node 203 generates a NAT translated downlink packet by replacing the destination IP of the subsequent downlink data with a NAT translated destination IP, based on the change to the destination IP of the initially processed downlink data packet as indicated by the NAT routing information. Finally, the upstream communication node 203 transmits the NAT translated downlink packet to the downstream communication node 202 for forwarding to the client device 201.

According to embodiments of the present disclosure, by utilizing the surplus processing power of the upstream node to pre-process the traffic for the downstream node, the downstream node is relieved of the CPU-intensive task of NAT processing, thereby avoiding becoming a performance bottleneck in the data routing system, enhancing the overall network performance and accelerating the routing of subsequent data packets.

Figures 2B, 3:
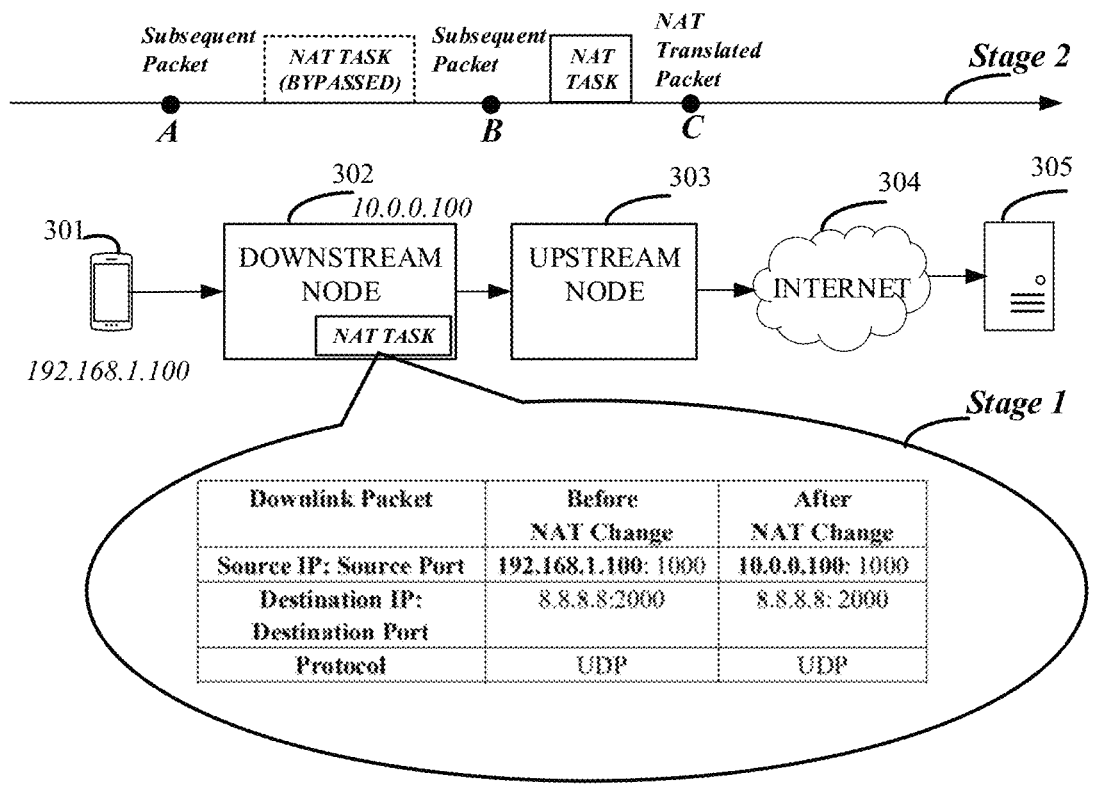
FIG. 2B shows an exemplary schematic diagram illustrating an example of Network Address Translation (NAT) routing information for routing downlink data packets for the client device according to an embodiment of the present disclosure.
FIG. 3 shows an exemplary schematic diagram for routing uplink data packets for a client device according to an embodiment of the present disclosure.

FIG. 2B shows an exemplary schematic diagram illustrating an example of NAT routing information for routing downlink data packets for the client device according to an embodiment of the present disclosure.

As shown in FIG. 2B, and in combination with the descriptions of FIG. 2A, the NAT routing information contains information on NAT related changes made to the downlink packet. For example, for a downlink data packet which has the source IP and source port of 8.8.8.8:1000, the destination IP and destination port of 10.0.0.100:2000 and the protocol of UDP, the Destination IP should be altered from 10.0.0.100 to 192.168.1.100. Accordingly, for subsequent downlink data packets also having the source IP and source port of 8.8.8.8:1000, the destination IP and destination port of 10.0.0.100:2000 and the protocol of UDP, the Destination IP should also be altered from 10.0.0.100 to 192.168.1.100. Thus, the NAT routing information synchronized from the downstream node and containing the NAT related changes on the Destination IP can be effectively used by the upstream node for NAT processing of the subsequent downlink data packets.

Optionally, the NAT routing information synchronized from the downstream node not only indicate changes to the destination addresses involved in NAT processing (indicated in the column of "NAT translated IP: Port"), but may also indicate modifications to the MAC address (indicated in the column of "Translated MAC address") and the correct client interface for forwarding the downlink data packet to the correct client device (indicated in the column of "Client Interface"). It should be noted that in conventional approaches, the MAC address modification and client interface lookup operations should have been performed by the downstream node itself, which causes a great burden for its limited processing capability.

Specifically, in conventional approaches, the tasks need to be performed by the downstream communication node 102 when routing a data packet between the client device 101 and the upstream communication node 103, for downlink traffic, involve at least the followings: (1) performing NAT translation on the destination IP address of the downlink packet originated from the external node and intended for the client device; (2) looking up a routing table to find out an appropriate client interface for forwarding the downlink packet to the client interface connected to the client device; (3) modifying the source MAC address and destination MAC address of the downlink packet; and (4) delivering the downlink packet to the appropriate client interface for transmission to the client device. However, according to the embodiments of the present disclosure, at least a part of the tasks of the downstream communication node 102 can be offloaded to the upstream communication node 103, thereby reducing the CPU consumption of the downstream node.

According to a first example, in addition to Layer 3 NAT operations, the upstream communication node 203 can also take over Layer 2 MAC address modification.

Firstly, the upstream communication node 203 obtains, from the downstream communication node 202, the MAC address related information for the data packet initially processed by the downstream communication node 202 on its own. Specifically, the MAC address related information is generated by the downstream communication node 202 based on one or more MAC address related changes made to the data packet when routing the data packet between the client device 201 and the upstream communication node 203. For example, the destination MAC address of the downlink packet should be modified to "MAC A" of the client device 201 so as to successfully arrive at the client device 201. Then, the upstream communication node 203 performs one or more modifications to the MAC address of subsequent data packets one behalf of the downstream communication node 202, based on the MAC address related information obtained therefrom.

In this example, to ensure that the downlink packet successfully reaches the client device 201, the destination MAC address should be modified to the "MAC A" of the client device 201. Consequently, the downstream communication node 202 can synchronize the modifications it has made during its own MAC address modification process with the upstream communication node 203. This enables the upstream communication node 203 to share the processing burden required for MAC address modifications, thereby reducing the CPU consumption of the downstream communication node 202.

According to a second example, the upstream communication node 203 can also tag the subsequent data packet with the appropriate client interface, simplifying the task for the downstream communication node 202 to look up the correct client interface.

In this example, the client device 201 is connected to one of multiple client interfaces (such as Ethernet interface, 2.4G Wi-Fi interface, 5G Wi-Fi interface, among other interfaces) of the downstream communication node 202. In conventional approaches, the downstream communication node 202 would typically need to look up the routing table to determine the appropriate interface for forwarding the downlink packet to the client device. However, in the present disclosure, the downstream communication node 202 can record the client interface when it initially processes the data packet, and synchronize this information with the upstream communication node 203. Accordingly, the NAT routing information shared from the downstream communication node 202 also indicates the correct client interface for communicating the data packet for the client device 201. In this case, based on the obtained NAT routing information, the upstream communication node 203 tags the subsequent data packet with the indicated client interface of the downstream communication node 202, so that the downstream communication node 202 does not have to look up the routing table to find out the correct client interface.

This allows the upstream node to share the burden of looking up the correct client interface, further reducing the CPU consumption of the downstream node, preventing the downlink node from becoming a performance bottleneck, and enhancing the data throughput.

FIG. 3 shows an exemplary schematic diagram for routing uplink data packets for a client device according to an embodiment of the present disclosure.

As shown in FIG. 3, the network topology 300 described involves the transmission of an uplink data packet originating from a client device 301, passing through two communication nodes 302 and 303, and ultimately reaching an external node 305, via the Internet 304. It should be noted that the elements 301 through 305 in FIG. 3 are basically the same as the elements 101 through 105 in FIG. 1 and the elements 202 to 205 in FIG. 2A, with the detailed descriptions omitted for brevity.

Similar to FIG. 2A, the processing of the uplink data packet will also be described from the perspective of two stages: NAT entry learning and synchronization stage (as shown in Stage 1) and data packet acceleration processing stage (as shown in Stage 2).

Stage 1: NAT Entry Learning and Synchronization

As depicted in Stage 1 of FIG. 3, the downstream communication node 302 initially performs NAT processing on the uplink data packet on its own. Specifically, for an incoming packet at the downstream communication node 302 (which is originated from the client device 301), the source IP and source port are 192.168.1.100:1000, and the destination IP and destination port are 8.8.8.8:2000, with the protocol being UDP. To enable the data packet from the client device 301, which uses a private IP address 192.168.1.100, to be successfully transmitted outward, the source IP of the packet should be changed from the client's private address to the IP address 10.0.0.100 of the downstream communication node 302, as depicted by the content of "Source IP" before and after the NAT change. After completing this NAT processing and learning the necessary NAT change for this packet, the downstream communication node 302 can then synchronize and share the NAT routing information related to this NAT change with the upstream communication node 303, which will be used by the upstream communication node 303 for subsequent NAT processing of uplink packets, as described in Stage 2.

Stage 2: Data Packet Acceleration Processing

As shown in Stage 2 of FIG. 3, at Point A, for subsequent uplink packets, the downstream communication node 302, upon receiving the subsequent data packet from the client device 301, can forego NAT related processing and directly forward it to the upstream communication node 203, since it is aware that the upstream communication node 303 will be handling the NAT related changes on behalf of the downstream communication node 302. This approach defers the NAT processing (as indicated by the dashed line block representing the bypassed NAT task), as shown between Point A and Point B. Later, as shown at Point C, the upstream communication node 303 can use the NAT routing information previously synchronized from the downstream communication node 302 to perform the NAT processing that would typically be done by the downstream communication node 302, thus generating a NAT translated packet. Accordingly, the NAT translated packet can be transmitted from the upstream communication node 303 to the external node 305 via the Internet 304.

In the embodiments of the present disclosure, to allow for the synchronization of the NAT routing information for uplink traffic, the data packet initially processed by the downstream communication node 302 itself should be an uplink data packet, and the one or more NAT related changes indicated by the NAT routing information should include at least a change to a source IP of the uplink data packet. Accordingly, in order to perform NAT on a subsequent data packet to be communicated between the client device 301 and the external node 305 based on the obtained NAT routing information, the upstream communication node 303 performs the following actions.

Firstly, the upstream communication node 303 obtains a subsequent uplink data packet, which is originated from the client device 301 and forwarded to the upstream communication node 303 via the downstream communication node 302. It should be noted that the downstream communication node 302 directly forwards the subsequent uplink data packet to the upstream communication node 303 without making NAT related changes to the subsequent uplink data packet. Subsequently, in response to a match between the subsequent uplink data packet and the NAT routing information, e.g., a match of certain field of the subsequent uplink data packet with the information contained in the NAT routing information, the upstream communication node 303 generates a NAT translated uplink packet by replacing the source IP of the subsequent uplink data with a NAT translated source IP based on the change to the source IP of the uplink data packet. Finally, the upstream communication node 303 provides the NAT translated uplink packet to the external node.

According to embodiments of the present disclosure, by delaying or transferring the execution of NAT operations to the upstream node, the CPU consumption on the downstream node can be alleviated, preventing it from becoming a performance bottleneck, and improves the efficiency of data packet routing. By offloading the NAT processing tasks, the downstream node can focus on the straightforward transmission of data packets without incurring the computational overhead associated with NAT operations.

It should be noted that, in addition to the NAT processing described for uplink packets, similar to the depiction in FIG. 2B, the downstream communication node 302 can also learn the MAC address modifications necessary during the processing of initial uplink data packets on its own, and synchronize this information with the upstream communication node 303. Accordingly, the upstream communication node 303 can further take over the task of MAC address modification on behalf of the downstream communication node 302, thereby further reducing the processing burden on the downstream communication node 302.

FIG. 4 shows an exemplary schematic diagram for routing data packets for a client device in a data routing network comprising an upstream router and a downstream router according to an embodiment of the present disclosure.

The network topology of the data routing network 400, as depicted in FIG. 4, illustrates a cascading connection between a downstream router 402 and an upstream router 403, which are arranged in different levels of a hierarchy of the data routing network 400. These routers are responsible for routing data packets (both uplink and downlink) between client devices 401a through 401c and an external node 405 via the Internet 404. The specific operations of the downstream router 402 and the upstream router 403 can refer to the processing described for the downstream and upstream communication nodes in FIGS. 1 through 3. For the sake of brevity, these operations are not repeated here.

For example, in the network topology formed by a cascade of multiple routers, efficient NAT processing (and optionally, efficient MAC address modification and client interface lookup) can be efficiently performed across different routers. For example, the efficient NAT processing can be based on the NAT routing information learnt and recorded by the downstream router 402 when it routed and processed initial uplink or downlink packets between the client device 401 and the upstream router 403. Subsequently, the NAT routing information is shared and synchronized to the upstream router 403, for facilitating the processing of subsequent uplink or downlink packets to be communicated between the client device 401 and the external node 405 by the upstream router 403 on behalf of the downstream router 402. In this way, the NAT task on the subsequent uplink or downlink packets can be omitted or bypassed at the downstream router 402, as illustrated by the dashed line block representing the bypassed "NAT TASK" in FIG. 4, which is offloaded to the upstream router 403, as illustrated by the solid line block representing the taken-over "NAT TASK" in FIG. 4. This prevents a low-performance router in lower levels of the hierarchy of the data routing network from becoming a bottleneck of the data routing network.

It should be noted that, as shown in FIG. 4, the upstream router 403 can also be connected to multiple client devices 401d and 401e. If necessary, NAT technology can also be implemented at the upstream router 403 to address the issue of IP address scarcity. In this case, it is understandable that when the NAT tasks of the downstream router 402 are offloaded to the upstream router 403, the upstream router 403 not only needs to complete the NAT tasks that should have been performed by the downstream router 402, but also needs to fulfill its own NAT tasks, when it has sufficient performance.

It should be noted that the hierarchy depicted in FIG. 4, illustrating the data routing network 400, is merely exemplary. The number of levels of the hierarchy, the number of routers, and the arrangement of different routers across various levels are provided for illustrative purposes. The embodiments of the present disclosure can be applied to different hierarchies and can accommodate a greater number of routers distributed across a greater number of levels. Those skilled in the art understand that the proposed approach can be implemented in scenarios where downstream routers have insufficient performance capabilities, while upstream routers have excess performance capacity. The key requirement is that the downstream router should synchronize the NAT information it has learned and recorded during its own NAT processing with the upstream router, for subsequent use by the upstream router in processing of subsequent data packets on behalf of the downstream router.

The implementation of the present disclosure in the hierarchical network topology offers several technical advantages, including improved network efficiency, reduced latency in data packet routing, and the ability to balance the computational load across different routers of the hierarchical network topology. This approach is particularly beneficial for networks with routers of varying performance capabilities, where the higher-performance routers in higher levels of the hierarchy can assist the lower-performance routers in lower levels of the hierarchy, thus improving the overall performance, such as the data throughput.

FIG. 5 shows an exemplary schematic diagram for routing data packets for a client device in a cellular router comprising a cellular module and a Wi-Fi routing module according to an embodiment of the present disclosure.

The connection topology 500, as described in FIG. 5, includes a cellular router 504 with a downstream Wi-Fi routing module 502 and an upstream cellular module 503 (such as an LTE/5G module). Specifically, the cellular router 504 is an advanced telecommunications device, such as an LTE/5G router, that enables the Internet access by connecting to cellular networks, and functions as a bridge between the cellular network infrastructure 505 and the client devices 501 that require Internet access.

The Wi-Fi routing module 502 and cellular module 503 are connected via PCI, USB or other inter-connections within the cellular router 504, and each of the modules can be implemented in the form of a respective chip, circuitry, and unit and the like and responsible for routing data packets (both uplink and downlink) between the client device 501 and an external network entity 505, for example, the cellular network infrastructure, such as a base station. The specific operations of the Wi-Fi routing module 502 and the cellular module 503 can refer to the processing described for the upstream and downstream nodes in FIGS. 1 through 3. For the sake of brevity, these operations are not repeated here.

It is known that modern routers are increasingly offering multiple access methods, such as xDSL, LTE/5G, fiber, and Ethernet access, and are becoming more modular to better integrate resources. Different access methods typically use corresponding chips and systems to implement their access functions. For example, a typical LTE/5G router comprising an LTE/5G module responsible for providing LTE/5G access functionality and a Wi-Fi routing module responsible for providing routing and Wi-Fi access functionality. In practice, manufacturers may use Wi-Fi routing modules with lower CPU performance to reduce product costs. This can lead to a situation where the LTE/5G module is overperforming, but the Wi-Fi routing module is underpowered, causing the data volume from the LTE/5G module to the wireless clients connected to the Wi-Fi routing module to exceed the processing capacity of the Wi-Fi routing module, thus causing a bottleneck along the data routing path between the cellular network infrastructure and the client device, and cannot reach the peak performance that can be achieved by the overall cellular router.

According to the present disclosure, and as shown in FIG. 5, taking the downlink traffic processed by the cellular router 504 as an example, the data packet modification work (such as NAT processing on the data packet, and optionally, MAC address modifications and client interface tagging on the data packet) that the Wi-Fi routing module 502 would typically perform can be pre-processed by the upstream cellular module 503, so that when the data packet is handed over to the Wi-Fi routing module 502, it is already a modified data packet. Then, the Wi-Fi routing module 502 only needs to forward the data packet directly to the Wi-Fi interface for transmission to the Wi-Fi client device 501, effectively reducing the CPU load on the Wi-Fi routing module 502 and enhancing the network performance for the downlink traffic from the cellular network 505 to the Wi-Fi client device 505.

Specifically, in the cellular router 504, efficient NAT processing (and optionally, efficient MAC address modification and client interface lookup) can be performed across different modules of the router. For example, the efficient NAT processing can be based on the NAT routing information learnt and recorded by the Wi-Fi routing module 502 when it routed and processed initial uplink or downlink packets between the client device 501 and the cellular module 503. Subsequently, the NAT routing information is shared and synchronized to the cellular module 503, for facilitating the processing of subsequent uplink or downlink packets to be communicated between the cellular network 505 and the Wi-Fi client 501 by the cellular module 503 on behalf of the Wi-Fi routing module 502. In this way, the NAT task on the subsequent uplink or downlink packets can be omitted or bypassed at the Wi-Fi routing module 502, as illustrated by the dashed line block representing the bypassed "NAT TASK" in FIG. 5, which is offloaded to the cellular module 503, as illustrated by the solid line block representing the taken-over "NAT TASK" in FIG. 5. This approach prevents a low-performance Wi-Fi routing module from becoming a bottleneck for data routing.

Although FIG. 5 illustrates a single client device, it is to be understood that a plurality of client devices may connect to the cellular router to obtain Internet access. These client devices can connect to the cellular router either through wired or wireless interfaces. The cellular router is designed to accommodate multiple client devices, providing them with Internet access via appropriate wired or wireless interfaces. The present disclosure does not impose any limitation on how the client devices are connected to the cellular router.

This implementation allows the cellular router to efficiently perform NAT processing (as well as optional MAC address modification and client interface lookup), thereby avoiding the bottleneck caused by low-performance Wi-Fi routing module. The cellular module, with its surplus performance, takes over the NAT and other tasks that the Wi-Fi routing module would otherwise struggle with, leading to enhanced overall network performance (such as the data throughput) and efficient data packet routing.

Figure 6:
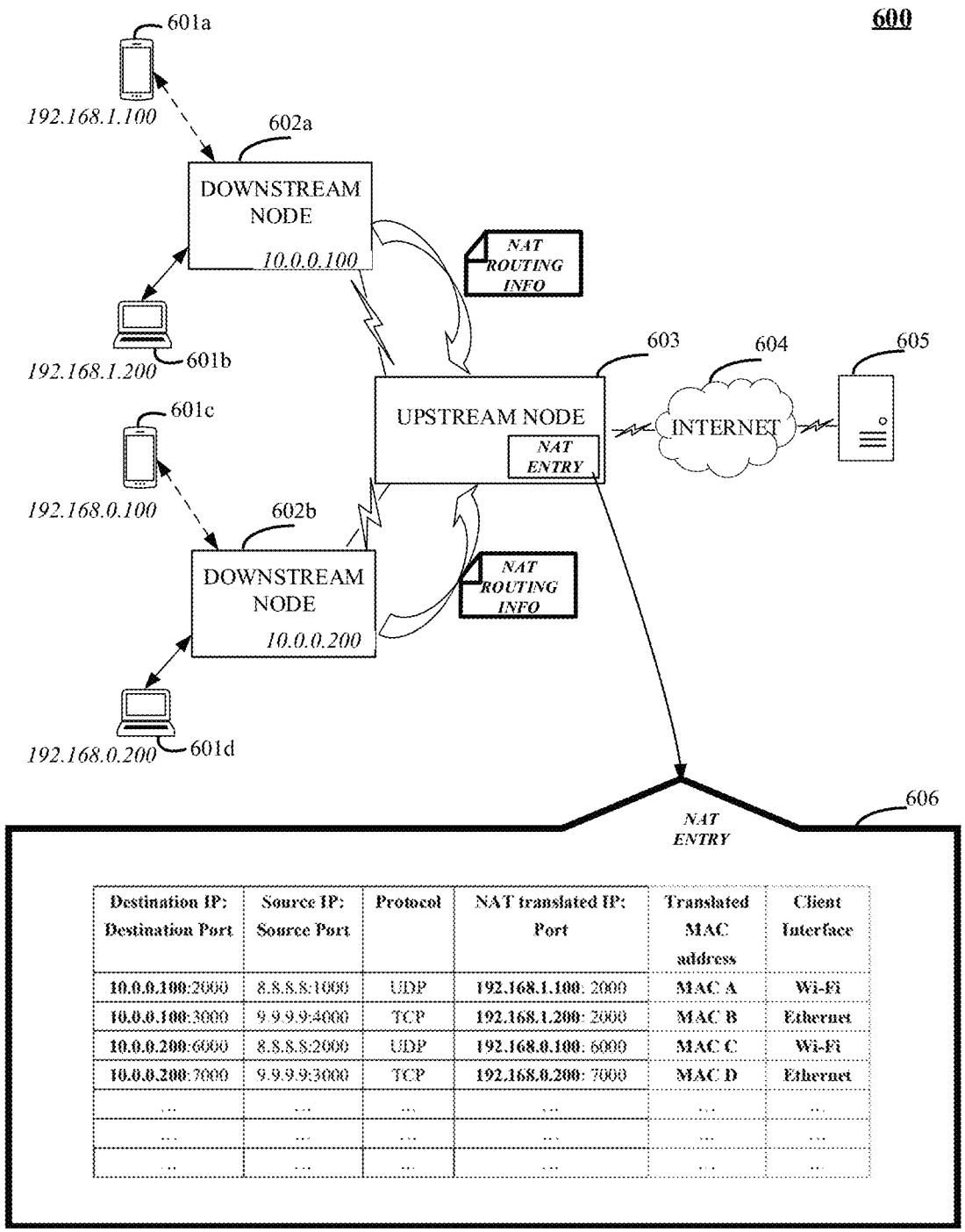
FIG. 6 shows another exemplary architecture for routing data packets for one or more client devices according to an embodiment of the present disclosure.

FIG. 6 shows another exemplary architecture for routing data packets for one or more client devices according to an embodiment of the present disclosure;

The connection topology 600, as described in FIG. 6, includes an upstream communication node 603 connected to two downstream nodes 602a and 602b, with IP addresses 10.0.0.100 and 10.0.0.200, respectively. In addition, the downstream communication node 602a is connected to two client devices 601a and 601b, with private IP addresses 192.168.1.100 and 192.168.1.200. Through downstream communication node 602a and upstream communication node 603, data packets are exchanged between clients 601-601b and an external node 605 via the Internet 604, for both uplink and downlink traffic.

Similarly, the downstream communication node 602b is connected to two client devices 601c and 601d, with private IP addresses 192.168.0.100 and 192.168.0.200. Through downstream communication node 602b and upstream communication node 603, data packets are also exchanged between clients 601c and 601d and the external node 605 via the internet 604, for both uplink and downlink traffic.

In traditional approaches, the downstream nodes 602a would perform NAT operations when routing data between clients 601a through 601b and the upstream communication node 603. Similarly, NAT operations would also be required by the downstream nodes 602b for data routing between clients 601c to 601d and the upstream communication node 603. However, in the present disclosure, downstream nodes 602a and 602b can learn and record the NAT related changes they perform and pass this information to the upstream communication node 603 in the form of the NAT routing information. This allows the upstream communication node 603 to maintain and generate a list of NAT related changes based on the synchronized information from the downstream nodes 602a and 602b, thereby performing the NAT operations for subsequent packets that would typically be done by the downstream nodes 602a and 602b.

Specifically, in the connection topology 600, the upstream communication node 603 is responsible for maintaining NAT entries for its downstream nodes 602, such that it may take over the NAT tasks of its downstream nodes 602. The downstream nodes 602a and 602b may delegate the NAT operations to the upstream communication node 603 by synchronizing NAT routing information indicating NAT related changes made to the packets. In turn, the upstream communication node 603 may obtain the NAT routing information from its downstream nodes 602a and 602b, and generate a plurality of NAT routing entries for data packets communicated between the client devices 601 and the external node 605 based on the NAT routing information received from the downstream nodes 602a and 602b. In this way, the upstream communication node 603 maintains a comprehensive list of NAT entries that cover necessary modifications for the data packets originated from or intended for the client devices 601. With the NAT operations offloaded, the downstream nodes 602a and 602b can efficiently forward data packets without performing the CPU-intensive NAT processing, allowing the downstream nodes to operate without becoming a bottleneck.

As shown in FIG. 6, and indicated by the reference number 606, a list of NAT entries is generated and maintained by the upstream communication node 603, which consolidates the NAT change information for the data packets of the client devices served by the downstream nodes 602 connected to the upstream communication node 603. For example, for downlink traffic, the list indicates the destination addresses before and after the NAT operation, as well as optional MAC address modifications and the tagged client interfaces. This eliminates the need for the downstream nodes to perform packet modification work.

According to a first example, each of the plurality of NAT routing entries indicates one or more of the following: a source IP address, a source port, a destination IP address, a destination port, a protocol, and a NAT translated address of a respective data packet. This approach ensures that each entry encompasses the essential elements of the data packet that may undergo translation during the NAT process. Notably, for downlink traffic, the NAT translated address refers to the NAT translated destination IP address, whereas for uplink traffic, the NAT translated address refers to the NAT translated source IP address.

According to a second example, each of the plurality of NAT routing entries further indicates a changed MAC address of the data packet. This feature allows the upstream node to not only manage the NAT translations but also to perform modifications at the data link layer, specifically updating the MAC addresses as required. As depicted by the dashed line block in FIG. 6, this MAC address related information is optional, but it is beneficial for ensuring that the data packets are correctly addressed and routed at the hardware level.

In addition to the NAT and MAC address information, each entry can also specify the client interface of the downstream node to which the data packet should be forwarded. This information enables the downstream node to efficiently route the data packets to the appropriate client interface without the need for additional lookup operations. This feature is particularly useful in scenarios where the downstream node has multiple client interfaces and the client device may be connected to one of them, and the forwarding of data packets via the correct interface is critical for reliably delivering the packet for the client device.

By incorporating these aspects into the NAT routing entries, the upstream node can effectively manage the network's NAT operations on behalf of the downstream node, and ensure efficient data packet routing. This centralized approach alleviates the processing burden on downstream nodes, enhances the network performance, and provides a scalable solution for networks with multiple client devices while supporting NAT technology.

In accordance with the present disclosure, the communication node, which may be an upstream node, such as an upstream router of a data routing network or upstream module of a router, is also responsible for the regular cleanup of these NAT routing entries.

According to a first example, the upstream node may delete one or more NAT routing entries of the plurality of NAT routing entries upon receipt of indications from the downstream node, which may indicate that the data packets corresponding to the one or more NAT routing entries will no longer be communicated between the client device and the external site. For example, a data flow (such as for UDP and TCP session) corresponding to a specific application program or service may be ended, so the NAT routing entries indicating the corresponding tuple of a source IP, a source port, a destination IP, a destination port, a protocol will no longer be used. This may occur, for example, if the client device voluntarily stops the data session, program or service, through a four-way handshake, and the downlink node may report the upstream node of this information for deletion of related NAT entries.

According to a second example, the upstream node may delete one or more NAT routing entries of the plurality of NAT routing entries based on aging information of the plurality of NAT routing entries. According to embodiments of the present disclosure, the upstream node evaluates the aging information of the plurality of NAT routing entries. For example, aging information is a timestamp or a counter that indicates how long a specific NAT entry has been stored in the memory of the upstream node without being used. Based on the aging information, the upstream node identifies those NAT routing entries that have exceeded a predetermined time threshold. Accordingly, the upstream node proceeds to delete the identified NAT routing entries that are considered obsolete. Additionally or alternatively, the downstream node evaluates the aging information of the plurality of NAT routing entries, and reports to the upstream node which of the NAT routing entries should be deleted. This may occur, for example, if the client device ended the data session, program or service unexpectedly without an explicit procedure of four-way handshake, such as when the client device is powered down or otherwise disconnects from the communication node, and the cleanup should be based on the aging information.

The cleanup process helps to clear outdated NAT related information and free up memory resources within the uplink communication node, and it also helps to expedite the NAT translations with fewer outdated NAT entries to search through.

Figure 7:
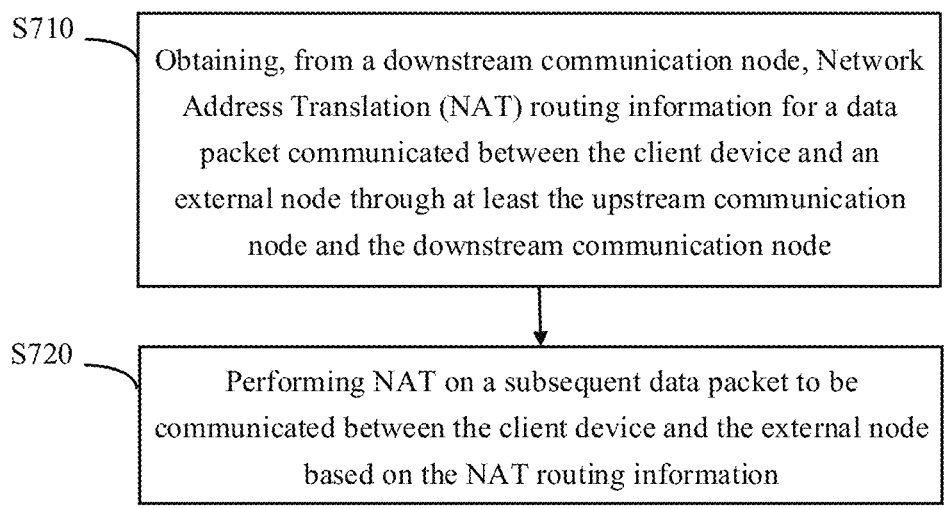
FIG. 7 shows a flowchart of a computer-implemented method of routing data packets for a client device according to an embodiment of the present disclosure.

FIG. 7 shows a flowchart of a computer-implemented method of routing data packets for a client device according to an embodiment of the present disclosure.

The method may be implemented in the communication node (namely, the upstream communication node) and the detailed description of method 700 can refer to the content described in the above with respect to FIGS. 1-6. For example, method 700 can be executed in the architecture described with respect to FIGS. 1-6 and according to the interactions between the communication nodes when routing data packets between the client device and the external node as described with respect to FIGS. 1-6. In addition, each step of method 700 can be performed by one or more processing units, such as central processing unit (CPU) of the client device.

With reference to FIG. 7, method 700 comprises steps S710-S720.

At step S710, the upstream communication node may obtain, from a downstream communication node, Network Address Translation (NAT) routing information for a data packet communicated between the client device and the external node through at least the upstream communication node and the downstream communication node. In an example of step S710, the NAT routing information can be generated by the downstream communication node based on one or more NAT related changes made to the data packet when routing the data packet between the client device and the upstream communication node At step S720, the upstream communication node may perform NAT on a subsequent data packet to be communicated between the client device and the external node based on the NAT routing information. Accordingly, the downstream communication node is configured to forward the subsequent data packet transparently between the client device and the upstream communication node without performing NAT on the subsequent data packet.

According to an embodiment, the data packet is a downlink data packet, and the one or more NAT related changes include at least a change to a destination IP of the downlink data packet. In this embodiment, performing NAT on a subsequent data packet to be communicated between the client device and the external node based on the NAT routing information comprises steps of: obtaining the subsequent data packet as a subsequent downlink data packet originated from the external node; in response to a match between the subsequent downlink data packet and the NAT routing information, generating a NAT translated downlink packet by replacing the destination IP of the subsequent downlink data with a NAT translated destination IP based on the change to the destination IP of the downlink data packet; and transmitting the NAT translated downlink packet to the downstream communication node for forwarding to the client device.

According to another embodiment, the data packet is an uplink data packet, and the one or more NAT related changes include at least a change to a source IP of the uplink data packet. In this embodiment, performing NAT on a subsequent data packet to be communicated between the client device and the external node based on the NAT routing information comprises: receiving the subsequent data packet as a subsequent uplink data packet from the downstream communication node, the subsequent uplink data packet being originated from the client device and forwarded to the upstream communication node; in response to a match between the subsequent uplink data packet and the NAT routing information, generating a NAT translated uplink packet by replacing the source IP of the subsequent uplink data with a NAT translated source IP based on the change to the source IP of the uplink data packet; and providing the NAT translated uplink packet to the external node.

According to a scenario for the present disclosure, the upstream communication node and the downstream communication node are implemented as an upstream router and a downstream router in different levels of a hierarchy of a data routing network.

According to another scenario for the present disclosure, the upstream communication node and the downstream communication node are implemented as a cellular module and a Wi-Fi routing module of a cellular router respectively.

Optionally, method 700 further comprises steps of obtaining, from the downstream communication node, Media Access Control (MAC) address related information for the data packet, the MAC address related information being generated by the downstream communication node based on one or more MAC address related changes made to the data packet when routing the data packet between the client device and the uplink communication node; and performing one or more modifications to the MAC address of the subsequent data packet based on the MAC address related information.

According to embodiments of the present disclosure, the client device is connected to one of multiple client interfaces of the downstream communication node. In this case, the NAT routing information further indicates the one of the multiple client interfaces of the downstream communication node for routing the data packet to the client device. Optionally, method 700 further comprises a step of tagging the subsequent data packet with the indicated client interface of the downstream communication node based on the NAT routing information.

Optionally, method 700 further comprises steps of generating, based on the NAT routing information obtained from one or more downstream communication nodes of the uplink communication node comprising the downstream communication node, a plurality of NAT routing entries for one or more data packets communicated between one or more client devices and one or more external nodes.

According to embodiments of the present disclosure, each of the plurality of NAT routing entries indicates one or more of a source IP, a source port, a destination IP, a destination port, a protocol, and a NAT translated IP of a respective data packet.

According to embodiments of the present disclosure, each of the plurality of NAT routing entries further indicates a changed MAC address of the respective data packet.

Optionally, method 700 further comprises steps of deleting one or more NAT routing entries of the plurality of NAT routing entries based on aging information of the plurality of NAT routing entries.

At least based on the above embodiments of the present disclosure, an improved mechanism for routing data packets for a client device through multiple communication nodes of a data routing network can be realized while effectively utilizing the capabilities of the communication nodes, addressing the latency caused by downstream communication nodes with weak performance, and accelerating the transfer of data traffic accordingly.

According to the embodiments of the present disclosure, the improvement in data throughput is realized by transferring the NAT related task from the downstream communication node with weaker performance to the upstream communication node with stronger performance, such that the data packets will not be stuck at the downstream communication node waiting to be NAT processed, and the overall data throughput of the system can be enhanced.

Figure 8:
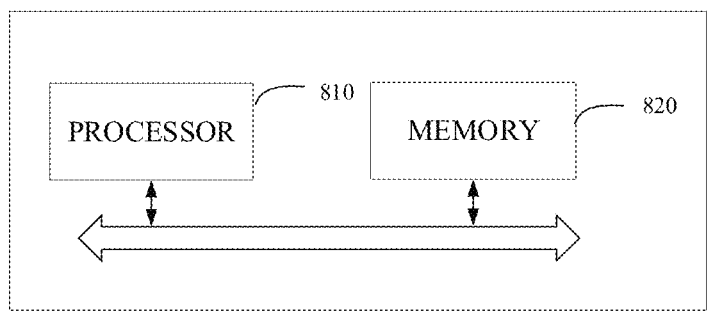
FIG. 8 is an exemplary block diagram illustrating a computing device according to embodiments of the disclosure.

FIG. 8 is an exemplary block diagram illustrating a computing device according to embodiments of the disclosure.

It should be noted that the computing device depicted in FIG. 8 can correspond to one or more of the client devices, the upstream and downstream communication nodes, and the external nodes as described in FIGS. 1-6 and can be used to perform the actions involved in routing data packets for a client device, for example, method 700 as described above.

As shown in FIG. 8, the computing device 800 can comprise processor 810 and memory 820. The processor 810 is communicatively coupled with the memory and configured to perform the methods discussed above.

Examples of the processor 810 comprise microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The processor 810 can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on memory 820.

The memory 820 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The memory 820 may reside in the processor 810, external to the processor 810, or distributed across multiple entities including the processor 810. The memory 820 may be embodied in a computer program product. By way of example, a computer program product may include a computer-readable medium in packaging materials. Those skilled in the art will recognize how to implement the described functionality presented throughout this disclosure depending on the particular application and the overall design constraints imposed on the overall system.

In addition, according to another embodiment of the present disclosure, a computer program product for routing data packets for a client device is disclosed. As an example, the computer program product comprises a non-transitory computer readable storage medium having program instructions embodied therewith, and the program instructions are executable by a processor. When executed, the program instructions cause the processor to perform one or more of the above described procedures, and details are omitted herein for conciseness.

The present disclosure may be a system, a method, and/or a computer program product at any possible technical detail level of integration. The computer program product may include a computer readable storage medium (or media)

having computer readable program instructions thereon for causing a processor to carry out aspects of the present disclosure.

Expression such as "according to", "based on", "dependent on", and so on as used in the disclosure does not mean "according only to", "based only on", or "dependent only on", unless it is explicitly otherwise stated. In other words, such expression generally means "according at least to", "based at least on", or "dependent at least on" in the disclosure.

Any reference in the disclosure to an element using the designation "first", "second" and so forth is not intended to comprehensively limit the number or order of such elements. These expressions can be used in the disclosure as a convenient method for distinguishing two or more units. Thus, a reference to a first unit and a second unit does not imply that only two units can be employed or that the first unit must precede the second unit in some form.

The term "determining" used in the disclosure can include various operations. For example, regarding "determining", calculating, computing, processing, deriving, investigating, looking up (e.g., looking up in tables, databases, or other data structure), ascertaining, and so forth are regarded as "determination". In addition, regarding "determining", receiving (for example, receiving information), transmitting (for example, transmitting information), input, output, accessing (for example, access to data in the memory), and so forth, are also regarded as "determining". In addition, regarding "determining", resolving, selecting, choosing, establishing, comparing, and so forth can also be regarded as "determining". That is, regarding "determining", several actions can be regarded as "determining".

The terms such as "connected", "coupled" or any of their variants used in the disclosure refer to any connection or combination, direct or indirect, between two or more units, which can include the following situations: between two units that are "connected" or "coupled" with each other, there are one or more intermediate units. The coupling or connection between the units can be physical or logical, or can also be a combination of the two. As used in the disclosure, two units can be considered to be electrically connected through the use of one or more wires, cables, and/or printed, and as a number of non-limiting and non-exhaustive examples, and are "connected" or "coupled" with each other through the use of electromagnetic energy with wavelengths in a radio frequency region, the microwave region, and/or in the light (both visible and invisible) region, and so forth.

When used in the disclosure or the claims 'including", "comprising", and variations thereof, these terms are as open-ended as the term "having". Further, the term "or" used in the disclosure or in the claims is not an exclusive-or.

The present disclosure has been described in detail above, but it is obvious to those skilled in the art that the present disclosure is not limited to the embodiments described in the disclosure. The present disclosure can be implemented as a modified and changed form without departing from the spirit and scope of the present disclosure defined by the description of the claims. Therefore, the description in the disclosure is for illustration and does not have any limiting meaning to the present disclosure.

What is claimed is:

1. A communication node for routing data packets for a client device comprising:
one or more processors;
a memory coupled to at least one of the one or more processors; and
a set of computer program instructions stored in the memory, in response to being executed by at least one of the one or more processors, is configured to perform actions of:
obtaining, from a downstream communication node, Network Address Translation (NAT) routing information for a data packet communicated between the client device and an external node along a communication path including at least the communication node as an upstream communication node of the downstream communication node and the downstream communication node to which the client device is connected; and
in response to obtaining the NAT routing information, performing NAT on a subsequent data packet to be communicated between the client device and the external node along the communication path based on the NAT routing information.

2. The communication node of claim 1, wherein
the NAT routing information is generated by the downstream communication node based on one or more NAT related changes made to the data packet in response to routing the data packet between the client device and the communication node.

3. The communication node of claim 2, wherein the data packet comprises a downlink data packet, and the one or more NAT related changes include at least a change to a destination IP of the downlink data packet, and
wherein performing NAT on a subsequent data packet to be communicated between the client device and the external node based on the NAT routing information comprises:
obtaining the subsequent data packet as a subsequent downlink data packet originated from the external node;
in response to a match between the subsequent downlink data packet and the NAT routing information, generating a NAT translated downlink packet by replacing the destination IP of the subsequent downlink data with a NAT translated destination IP based on the change to the destination IP of the downlink data packet; and
transmitting the NAT translated downlink packet to the downstream communication node for forwarding to the client device.

4. The communication node of claim 2, wherein the data packet comprises an uplink data packet, and the one or more NAT related changes include at least a change to a source IP of the uplink data packet, and
wherein performing NAT on a subsequent data packet to be communicated between the client device and the external node based on the NAT routing information comprises:
receiving the subsequent data packet as a subsequent uplink data packet from the downstream communication node, the subsequent uplink data packet being originated from the client device and forwarded to the communication node;
in response to a match between the subsequent uplink data packet and the NAT routing information, generating a NAT translated uplink packet by replacing the source IP of the subsequent uplink data with a NAT translated source IP based on the change to the source IP of the uplink data packet; and
providing the NAT translated uplink packet to the external node.

5. The communication node of claim 1, wherein the communication node and the downstream communication node are implemented as an upstream router and a downstream router in different levels of a hierarchy of a data routing network.

6. The communication node of claim 1, wherein the communication node and the downstream communication node are implemented as a cellular module and a Wi-Fi routing module of a cellular router respectively.

7. The communication node of claim 1, wherein the set of computer program instructions stored in the memory, in response to being executed by at least one of the one or more processors, is further configured to perform actions of:
 obtaining, from the downstream communication node, Media Access Control (MAC) address related information for the data packet, the MAC address related information being generated by the downstream communication node based on one or more MAC address related changes made to the data packet in response to routing the data packet between the client device and the communication node; and
 performing one or more modifications to the MAC address of the subsequent data packet based on the MAC address related information.

8. The communication node of claim 1, wherein the client device is connected to one of multiple client interfaces of the downstream communication node, and wherein the NAT routing information further indicates the one of the multiple client interfaces of the downstream communication node for routing the data packet to the client device, and
 wherein the set of computer program instructions stored in the memory, in response to being executed by at least one of the one or more processors, is further configured to perform actions of:
  tagging the subsequent data packet with the indicated client interface of the downstream communication node based on the NAT routing information.

9. The communication node of claim 1, wherein the set of computer program instructions stored in the memory, in response to being executed by at least one of the one or more processors, is further configured to perform actions of:
 generating, based on the NAT routing information obtained from one or more downstream communication nodes of the communication node comprising the downstream communication node, a plurality of NAT routing entries for one or more data packets communicated between one or more client devices and one or more external nodes.

10. The communication node of claim 9, wherein each of the plurality of NAT routing entries indicates one or more of a source IP, a source port, a destination IP, a destination port, a protocol, and a NAT translated IP of a respective data packet.

11. The communication node of claim 10, wherein each of the plurality of NAT routing entries further indicates a changed MAC address of the respective data packet.

12. The communication node of claim 9, wherein the set of computer program instructions stored in the memory, in response to being executed by at least one of the one or more processors, is further configured to perform actions of:
 deleting one or more NAT routing entries of the plurality of NAT routing entries based on aging information of the plurality of NAT routing entries.

13. The communication node of claim 1, wherein the downstream communication node is configured to forward the subsequent data packet transparently between the client device and the communication node without performing NAT on the subsequent data packet.

14. A method for routing data packets for a client device, the method implemented in a communication node and comprising:
 obtaining, from a downstream communication node, Network Address Translation (NAT) routing information for a data packet communicated between the client device and an external node along a communication path including at least the communication node as an upstream communication node of the downstream communication node and the downstream communication node to which the client device is connected; and
 in response to obtaining the NAT routing information, performing NAT on a subsequent data packet to be communicated between the client device and the external node along the communication path based on the NAT routing information.

15. The method of claim 14, wherein the NAT routing information is generated by the downstream communication node based on one or more NAT related changes made to the data packet in response to routing the data packet between the client device and the communication node.

16. The method of claim 15, wherein the data packet is a downlink data packet, and the one or more NAT related changes include at least a change to a destination IP of the downlink data packet, and
 wherein performing NAT on a subsequent data packet to be communicated between the client device and the external node based on the NAT routing information comprises:
  obtaining the subsequent data packet as a subsequent downlink data packet originated from the external node;
  in response to a match between the subsequent downlink data packet and the NAT routing information, generating a NAT translated downlink packet by replacing the destination IP of the subsequent downlink data with a NAT translated destination IP based on the change to the destination IP of the downlink data packet; and
  transmitting the NAT translated downlink packet to the downstream communication node for forwarding to the client device.

17. The method of claim 15, wherein the data packet is an uplink data packet, and the one or more NAT related changes include at least a change to a source IP of the uplink data packet, and wherein
 performing NAT on a subsequent data packet to be communicated between the client device and the external node based on the NAT routing information comprises:
  receiving the subsequent data packet as a subsequent uplink data packet from the downstream communication node, the subsequent uplink data packet being originated from the client device and forwarded to the communication node;
  in response to a match between the subsequent uplink data packet and the NAT routing information, generating a NAT translated uplink packet by replacing the source IP of the subsequent uplink data with a NAT translated source IP based on the change to the source IP of the uplink data packet; and
  providing the NAT translated uplink packet to the external node.

18. The method of claim 14, further comprising:
obtaining, from the downstream communication node, Media Access Control (MAC) address related information for the data packet, the MAC address related information being generated by the downstream communication node based on one or more MAC address related changes made to the data packet in response to routing the data packet between the client device and the communication node; and
performing one or more modifications to the MAC address of the subsequent data packet based on the MAC address related information.

19. The method of claim 14, further comprising:
generating, based on the NAT routing information obtained from one or more downstream communication nodes of the communication node comprising the downstream communication node, a plurality of NAT routing entries for one or more data packets communicated between one or more client devices and one or more external nodes.

20. A computer program product for routing data packets for a client device, the computer program product comprising a non-transitory computer readable storage medium having program instructions embodied therewith, the program instructions executable by a processor of a communication node to cause the processor to:
obtain, from a downstream communication node, Network Address Translation (NAT) routing information for a data packet communicated between the client device and an external node along a communication path including at least the communication node as an upstream communication node of the downstream communication node and the downstream communication node to which the client device is connected; and
after obtaining the NAT routing information, perform NAT on a subsequent data packet to be communicated between the client device and the external node along the communication path based on the NAT routing information.

* * * * *